United States Patent [19]
Larson et al.

[11] 3,905,488
[45] Sept. 16, 1975

[54] APRON CONSTRUCTION FOR A PALLET LOADER

[75] Inventors: Robert M. Larson, Mequon; Theodore D. Gabos, Grafton, both of Wis.

[73] Assignee: Jos. Schlitz Brewing Company, Milwaukee, Wis.

[22] Filed: Mar. 29, 1974

[21] Appl. No.: 456,037

[52] U.S. Cl. .............. 214/6 DK; 198/189; 198/195; 198/DIG. 7; 214/6 H
[51] Int. Cl.² .......................................... B65G 57/03
[58] Field of Search ...... 214/6 DK, 6 H, 6 P, 83.36; 198/183, 189, 195, DIG. 7

[56] References Cited
UNITED STATES PATENTS

| | | | |
|---|---|---|---|
| 2,028,479 | 1/1936 | Spicer | 198/195 X |
| 2,987,168 | 6/1961 | Franz | 198/195 |
| 3,241,689 | 3/1966 | Verrinder | 214/6 H |
| 3,669,247 | 6/1972 | Pulver | 198/189 |
| 3,698,572 | 10/1972 | Dahlem et al. | 214/6 DK |
| 3,735,858 | 5/1973 | Hartwig | 198/195 |
| 3,749,395 | 7/1973 | Bazzarone | 271/34 X |
| 3,785,476 | 1/1974 | Poerink | 198/189 |

Primary Examiner—Robert J. Spar
Assistant Examiner—Leslie J. Paperner
Attorney, Agent, or Firm—Andrus, Sceales, Starke & Sawall

[57] ABSTRACT

An apron construction for a pallet loader. The apron comprises a series of parallel tubes and the corresponding ends of the tubes are connected to chains which are mounted to travel in a path to move the apron from a horizontal supporting position to a vertical non-supporting position. A series of short plastic blocks are mounted on the tubes and each block has a pair of openings to receive two adjacent tubes. The blocks are arranged so that the joints between blocks, that extend longitudinally of the tubes, are staggered. A group of containers or cartons are pushed onto the apron when in the horizontal position, and the apron is then withdrawn to the vertical position so that the containers are deposited on a pallet. A safety mechanism senses upward deflection of the apron caused by a malfunction of the pallet lifting mechanism and operates to shut the power to the lifting mechanism to prevent bending or deformation of the apron tubes.

11 Claims, 9 Drawing Figures

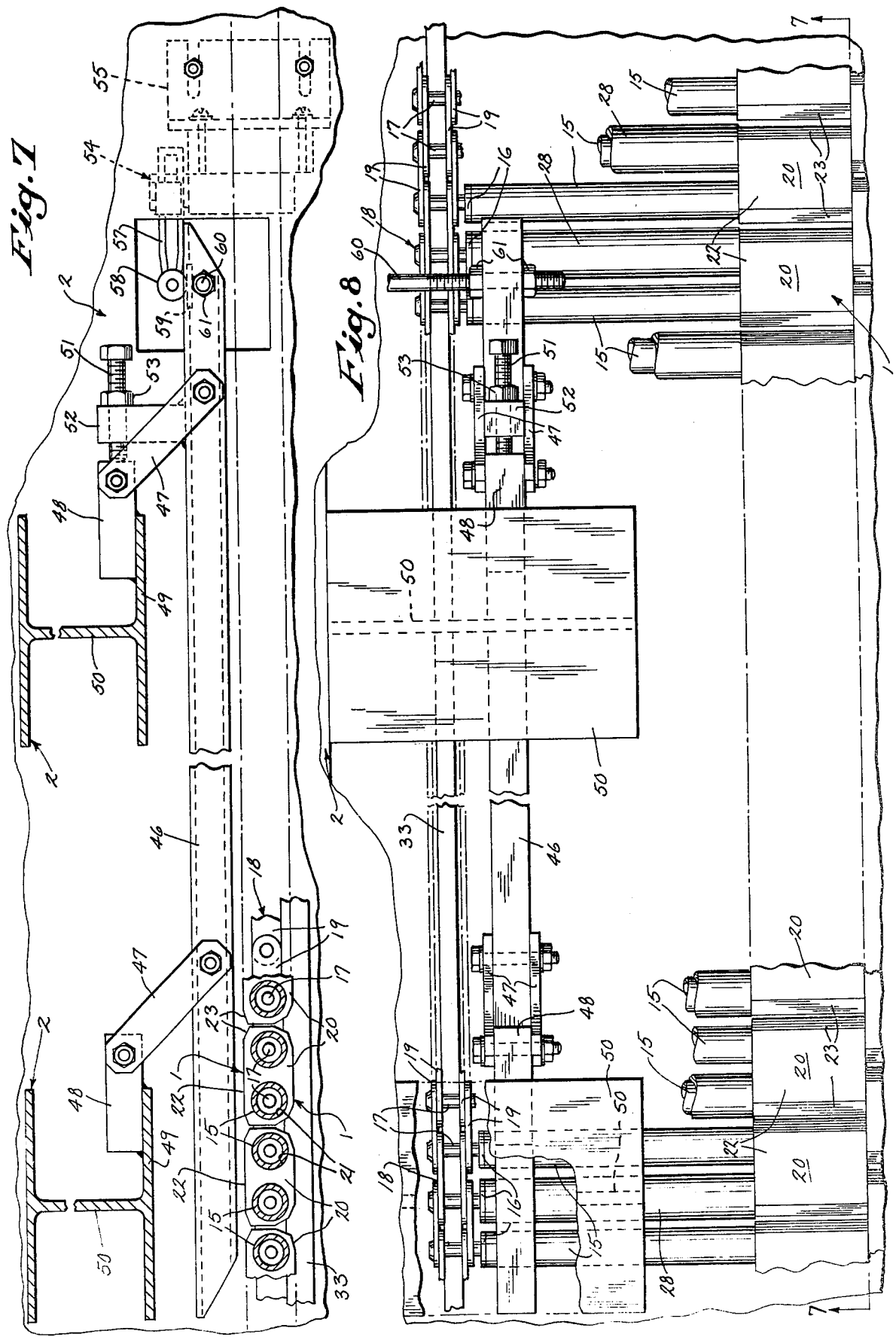

APRON CONSTRUCTION FOR A PALLET LOADER

BACKGROUND OF THE INVENTION

A pallet loader is used to stack containers, such as beer cases or cartons, on a pallet which is then loaded by a fork lift truck into a truck or railway car. The cases are brought to the conventional pallet loader on a conveyor, and periodically a group of cases is pushed from the conveyor onto a horizontal apron which is located above the pallet. When the desired number of cases are placed on the apron, the apron is withdrawn to a generally vertical position causing the cases to be lowered onto the pallet. The pallet is then lowered and the apron is returned to its horizontal supporting position where it can receive a second group of cases. The apron is again moved to the vertical position to lower the second group of cases onto the group of cases resting on the pallet. This procedure is repeated until the pallet is loaded with the desired stack of cases.

The conventional apron is composed of a series of generally parallel tubes which are connected at their corresponding ends to chains which are mounted to travel in a path to move the apron from the horizontal supporting position to the vertical non-supporting position. To minimize the width of the joints between adjacent tubes, the conventional apron is provided with a series of U-shaped stainless steel channels which serve to cover the upper surfaces of two adjacent tubes. In addition, stainless steel plates extend across the lower surfaces of two adjacent tubes and are connected to the corresponding channels.

Problems have arisen in the past with the use of the conventional apron in that the channels and plates which connect adjacent tubes provide continuous joints which extend the length of the tubes. Occasionally the pallet lifting mechanism may, through malfunction of controls, force the pallet upwardly into engagement with the apron with sufficient pressure to cause the tubes of the apron to bend. Bending of the tubes causes misalignment of the joints between the channels with the result that projecting edges are formed between the channels on which the cases or cartons can catch as they are pushed onto the apron. Similarly, deformation of the apron tubes can cause misalignment of the plates on the lower surface of the apron, resulting in exposed edges, and the flaps on the cases stacked on the pallet, if not completely closed, can catch on the exposed edges as the apron is withdrawn to the vertical position. If the cartons or cases catch on the projecting edges, misalignment of the stack of cases will occur, and as the cases are stacked to very close tolerances for loading in a truck or railway car, any misalignment of the stack has to be manually readjusted.

In some instances where substantial misalignment of the cases occurs due to the cases catching on projecting edges of the apron, the entire stack or load can be upset causing breakage and spillage.

In view of these problems the use of conventional pallet loaders require considerable supervision and labor for realignment of the stacks of cases.

SUMMARY OF THE INVENTION

The present invention relates to an improved apron construction for a pallet loader which eliminates the problems associated with aprons used in the past. In accordance with the invention the apron is composed of a series of generally parallel tubes with the corresponding ends of the tubes being connected to chains which are mounted to move the apron between a horizontal loading position and a vertical non-supporting position.

A series of relatively short plastic blocks are mounted on the tubes and each block is provided with a pair of openings to receive two adjacent tubes. The blocks are arranged so that the joints between blocks that extend longitudinally of the tubes are staggered, with the result, that there is no continuous joint which extends the length of the tubes.

A group of cases or cartons are adapted to be pushed onto the apron when in the horizontal loading position by a pusher mechanism and a pallet, which is supported on a lifting mechanism is positioned immediately beneath the apron. Subsequently the apron is withdrawn to the vertical position and the cases are deposited onto the pallet.

As the apron of the invention utilizes a series of short plastic blocks there is no continuous joint which extends across the apron, so that even in the event of deformation of the tubes, the short plastic blocks will compensate for the tube deformation so that there is no exposed edge of any substantial length on which the cases can catch.

Due to the use of the plastic blocks, a smoother and quieter operation is achieved as compared to aprons that have been used in the past. The plastic blocks have a lower coefficient of friction than metal supporting surfaces, thereby providing a smoother operation requiring less power to force the cases onto the apron and to withdraw the apron. As the plastic blocks have self-lubricating properties, the need for lubrication, which had been used in the past when dealing with steel aprons, is eliminated.

Furthermore the use of the plastic blocks reduces the overall weight of the apron, thereby reducing the stress on the drive mechanism.

The apron construction of the invention also includes a safety mechanism which will shut off the lifting unit for the pallet in the event the pallet moves upwardly to a position where it deflects the apron upwardly. This insures that in the event of a malfunction of the pallet lifting mechanism the tubes of the apron will not be bent or deformed by excessive pressure applied to the apron through the pallet lifting mechanism. This substantially reduces the cost of maintenance for the apron.

Other objects and advantages will appear in the course of the following description.

DESCRIPTION OF THE DRAWINGS

The drawings illustrate the best mode presently contemplated of carrying out the invention.

In the drawings:

FIG. 7 is a fragmentary plan view of a modified form of the invention utilizing safety bars;

FIG. 8 is a section taken along line 8—8 of FIG. 7; and

FIG. 9 is a plan view of the switch control mechanism associated with the safety bar.

DESCRIPTION OF THE ILLUSTRATED EMBODIMENT

Figure 1:
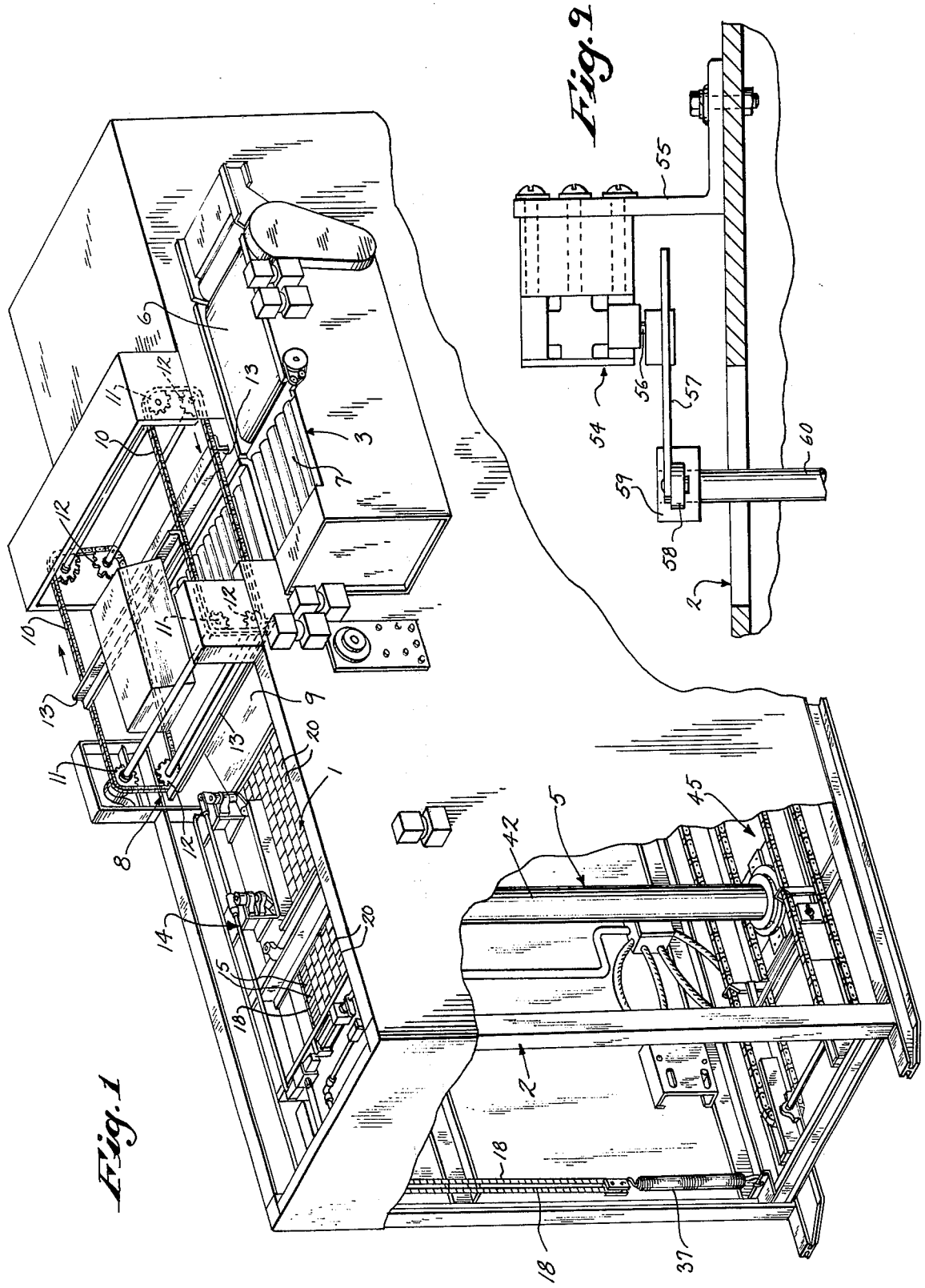
FIG. 1 is a perspective view of a pallet loader incorporating the apron of the invention.

FIG. 1 illustrates schematically a conventional pallet loader which incorporates the apron assembly 1 of the invention. The pallet loader includes a supporting structure or frame 2 and a conveyor system, indicated generally by 3, acts to convey a series of cases or cartons to the apron assembly. A pallet 4 is located beneath the apron 1 and is adapted to be raised and lowered by a lift mechanism 5. When the desired group of cases have been moved onto the apron 1, the apron is moved out from under the cases to thereby deposit the cases on the pallet 4.

The conveyor system 3 is conventional and in itself forms no part of the present invention. In general, the conveyor system 3 includes a belt conveyor 6 which terminates adjacent a roller conveyor 7 which operates in a direction 90° from the direction of operation of belt conveyor 6. A pusher bar assembly 8 is located above the roller conveyor 7 and serves to push the cases from the roller conveyor across a dead plate 9 and onto the apron 1.

The push-bar assembly 8 is a standard unit and includes a pair of endless chains 10, with each of the chains travelling over a pair of upper sprockets 11 and a pair of lower sprockets 12. The corresponding sprockets are connected by transverse shafts, and one of the sprockets is connected to a suitable drive mechanism, not shown, which acts to drive the chains in synchronization. A series of angle-shaped pusher bars 13 are connected to the chains 10, and as the chains moved in their endless paths, one of the bars 13 will engage a group of cases on the roller conveyor 7 and push the group across the dead plate 9 onto the apron 1.

A side and back dam assembly 14 is located above the apron 1 and serves as a side and back stop for the cases pushed onto the apron.

Figure 4:
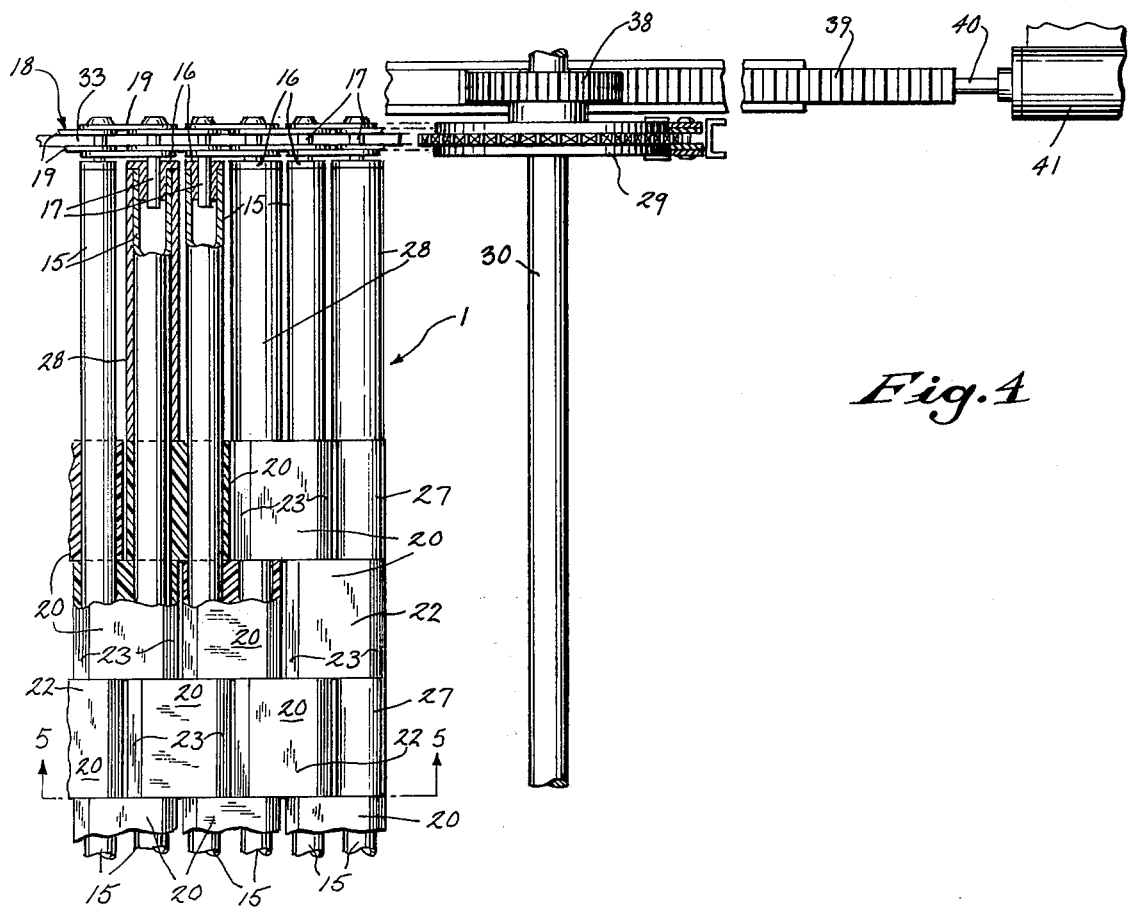
FIG. 4 is a fragmentary plan view showing the apron and its connection to the drive chain.
Figure 5:
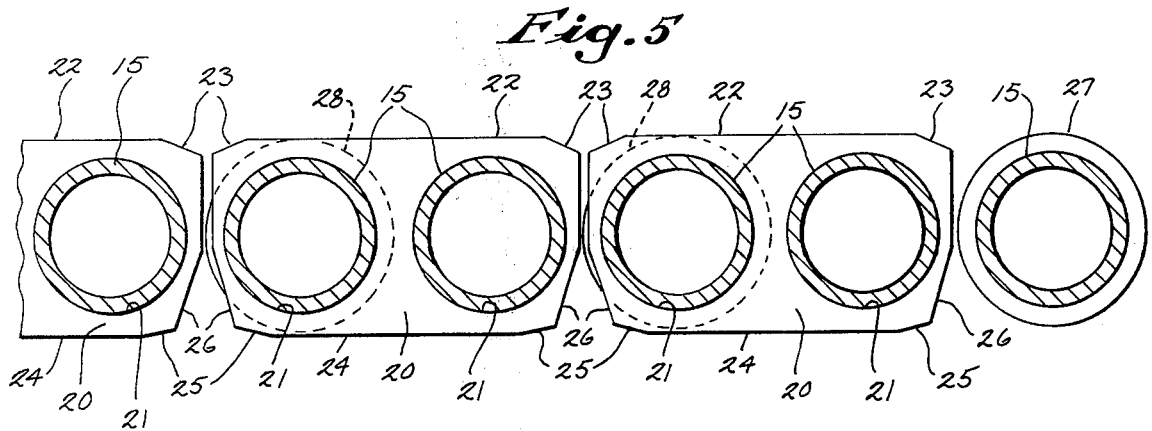
FIG. 5 is a section taken along line 5—5 of FIG. 4.

As best shown in FIGS. 4 and 5, the apron 1 is composed of a series of parallel tubes 15 which extends transversely across the frame 2. A bushing 16 is located within each end of the tubes 15, and pins 17 carried by chains 18 are mounted for rotation within the bushings 16. Chains 18 are conventional roller link chains composed of parallel links 19, and the pins 17, which are received within the bushings 16, connect the adjacent links together.

In accordance with the invention, a series of plastic blocks 20 are mounted on adjacent tubes 15. As shown in FIG. 4, the blocks are relatively short in length, and each block is provided with a pair of holes 21 which receive two adjacent tubes 15. The blocks 20 are arranged in a staggered fashion on the tubes 15 so that the joints between adjacent blocks do not extend continuously along the length of the tubes 15.

Each of the plastic blocks is provided with a flat upper surface 22 which supports the cases, and a pair of bevelled side edges 23 extend downwardly from the flat surface 22. The bevelled edges 23 provide a depression or recess at the joint between adjacent blocks to thereby minimize any projecting edge at the joint.

Each of the blocks 20 is also provided with a flat lower surface 24 and bevelled surfaces 25 connect the flat surface 24 with diagonal surfaces 26. The bevelled surfaces 25, as in the case of surfaces 23, minimize any sharp protruding edge at the joint between blocks, while the diagonal surfaces 26 enable the apron to move between the horizontal and vertical positions, as will be hereinafter described.

In order to provide the staggered block pattern, a series of cylindrical blocks 27 are utilized at the front and rear edges of the apron, and the blocks 27 are provided with a single hole to receive the end tubes 15 of the apron.

Cylindrical spacing sleeves 28 are disposed on the ends of tubes 15 and abut against the blocks 20. In certain cases where a greater width of apron is required, the blocks 20 can extend to the ends of the tubes 15, in which case the spacer sleeves 28 can be shortened or omitted.

The blocks 20 and 27 are formed of a plastic material, such as polyethylene, nylon, or acetal which has a low coefficient of friction and has self-lubricating properties, thereby enabling the cases to slide smoothly across the upper surfaces 22 of the blocks as the cases are pushed onto the apron by the pusher-bar assembly 8, and enabling the apron to be readily withdrawn from beneath the cases.

Figure 2:
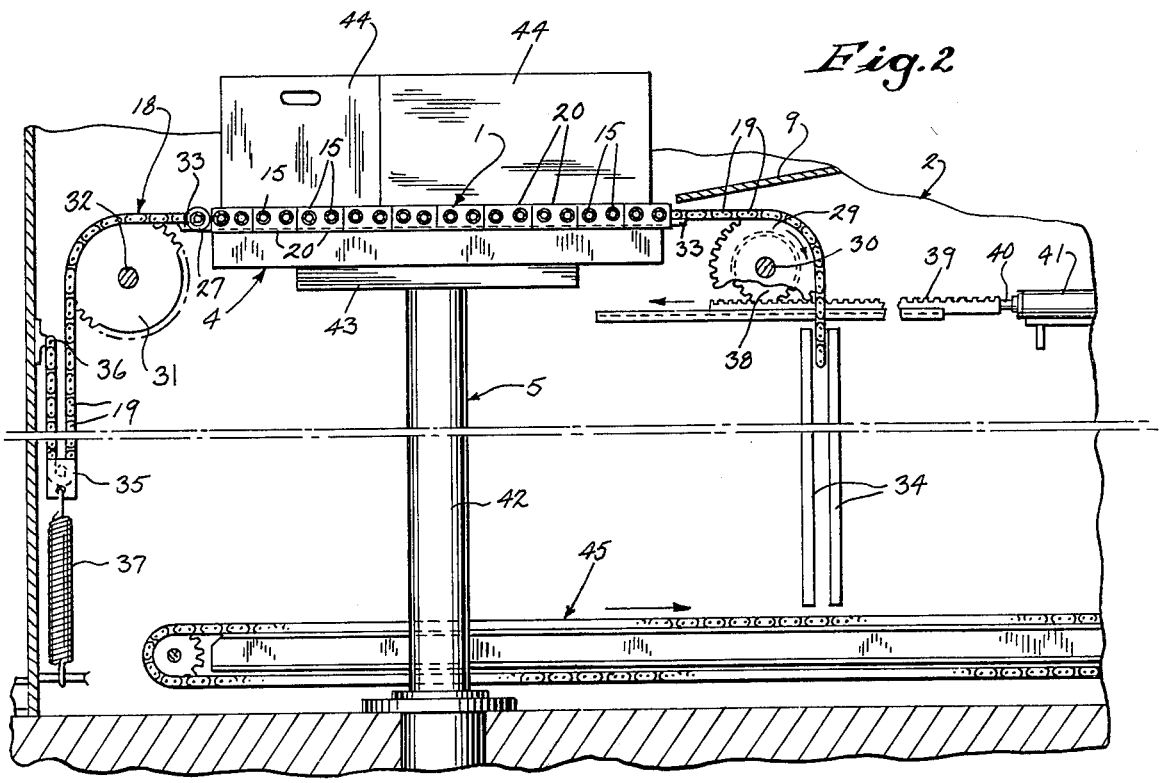
FIG. 2 is a side elevation of the pallet loader with the apron in position to receive a series of cases.

The pallet loader is constructed so that a group of cases are moved by the pusher bar assembly 18, across the dead plate 9 onto the apron 1 when the apron is in the horizontal supporting position as shown in FIG. 2. The apron is then withdrawn from beneath the group of cases and moved to a vertical position causing the group of cases to be lowered onto the pallet 4 which is located directly beneath the apron. After the cases have been deposited on the pallet, the pallet is lowered and the apron is returned to its horizontal position. A second group of cases is then pushed onto the apron, and the apron is subsequently withdrawn to the vertical position to deposit the second group of cases on the first group which is located on the pallet. The procedure is repeated until the desired number of cases has been stacked on the pallet.

To move the apron from the horizontal to the vertical position, a drive system is employed which includes a pair of drive sprockets 29 that are mounted on a transverse shaft 30 journalled within the frame 2. Each chain 18 is engaged with a drive sprocket 29, as well as with an idler sprocket 31. Idler sprockets 31 are connected together by transverse shaft 32. As shown in FIG. 2, guide bars 33 are connected to the frame 1 and are located horizontally beneath the path of travel of the chains 18. Guide bars 33 aid in supporting the chains 18 and tubes 15 when the apron is in the horizontal position.

Figure 3:
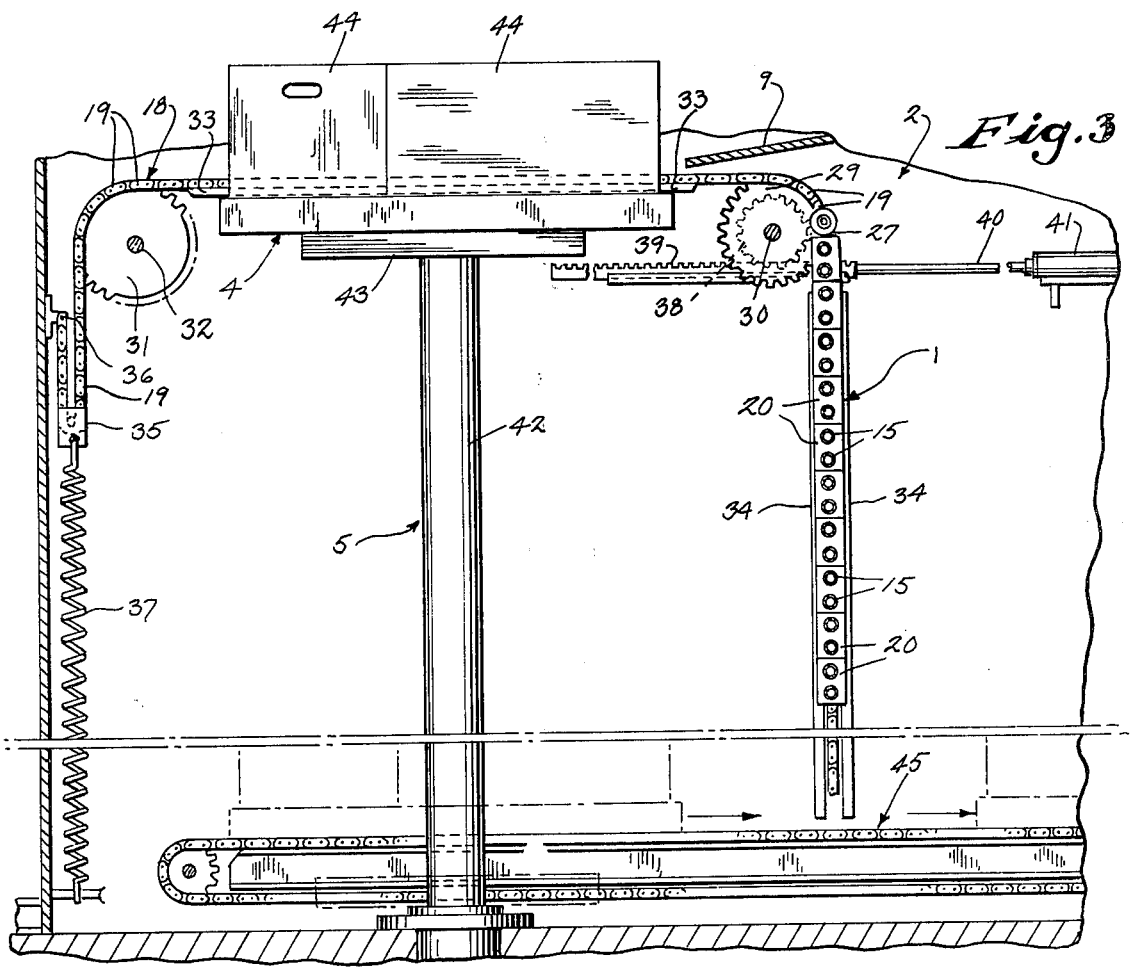
FIG. 3 is a view similar to FIG. 2 and showing the apron in the retracted position.

When the apron 1 is in the horizontal supporting position, as shown in FIG. 2, the free hanging ends of the chains 18 will be located slightly beneath the level of the drive sprockets 29. When the apron is moved to the vertical position, the free ends of chains 18 are guided in vertical movement by a pair of guide bars 34 which are connected to the frame 2. When the apron is in the vertical position, as shown in FIG. 3, the free ends of the chains 18 will be located adjacent the bottom of the supporting structure or frame 2.

The opposite ends of the chains 18 are engaged with floating sprockets 35 and are dead-ended at 36 adjacent the upper end of the frame. Each of the sprockets 35 is connected to the upper end of an extension spring 37 which is anchored at 38 to the frame 2. As the apron 1 is moved from the horizontal to the vertical position, the springs 37 will be extended and the force of the springs will aid in returning the apron to the horizontal position.

To drive the chains 18 in a reciprocating path, a pinion 38 is secured to drive shaft 30 and is engaged by a rack 39 which is guided for reciprocating movement by a suitable guide attached to the frame 2. The rack 39 is adapted to be moved in a reciprocating path by a hydraulic cylinder unit including a postion rod or ram 40 which is connected to the rack and is slidable within a cylinder 41. When the rack is moved by the cylinder unit to the left, as shown in FIG. 2, the apron will be moved from the horizontal supporting position to the vertical position. Conversely, when the rack is moved in the opposite direction, the apron will be moved back to the horizontal supporting position.

The lift mechanism 5 for the pallet is a hydraulic cylinder unit including a ram 42 which slides within a cylinder, not shown, and carries a platform 43. The pallet 4 can be a conventional wood pallet and is positioned on the platform 43 when the platform is at its lowermost position. After the desired stack of cases has been deposited on the pallet 4, the ram 42 is lowered to a position where the pallet will straddle a coveyor which will then move the loaded pallet to the exterior of the machine in a position to be engaged by a lift truck.

In operation of the pallet loader, the cases 44 are moved across the conveyors 6 and 7 and the pusher bar assembly acts to move a group of the cases across the deadplate 9 and onto the apron 1 which is in the horizontal supporting position. With the group of cases on the apron, the cylinder 41 is actuated to move the apron from the horizontal supporting position to the vertical position causing the cases to be deposited on the pallet 4 which is located immediately below the apron when in the horizontal position. After the cases have been deposited on the pallet, the ram 42 is lowered to lower the pallet and the supported group of cases and the apron is returned to the horizontal supporting position. A second group of cases is then pushed onto the apron and the apron is again withdrawn to the vertical position causing the second group of cases to be stacked on the first group on the pallet. This procedure is repeated until the desired stack of cases 44 has been loaded onto the pallet and the pallet is then lowered to a position where the transporting conveyor 45, can convey the loaded pallet to a location for subsequent handling.

A safety mechanism, as shown in FIGS. 7 and 8, can be employed to prevent the ram 42 from exerting excessive pressure through the pallet 4 against the underside of the apron 1, when the apron is in the horizontal supporting position. In the event of a malfunction of the controls for the lifting mechanism 5, the ram 42 and pallet 4 could be forced upwardly into engagement with the bottom surface of the apron, and as the pressure would be substantial, it could cause the tubes 15 of the apron to bend or deform.

The safety mechanism includes a pair of bars 46 which are mounted along the side of the frame 2 and as shown in FIG. 8, each of the bars 46 extends across the corresponding ends of the tubes 15. Each bar 46 is supported by a pair of links 47 with the upper end of the link being pivoted to a fixed support 48 which is secured to the lower flange 49 of an I-beam 50. The I-beams 50 extend laterally inward from the side of the frame 2, as shown in FIG. 8.

Under normal conditions, the lower surface of each safety bar 46 is approximately 1/16 to ¼ inch above the apron, as shown in FIG. 7, and the spacing between the safety bars 46 and the apron 1 can be varied by means of an adjusting bolt 51 which is threaded within a block 52 secured to the upper surface of the bar 46. Lock nut 53 is threaded onto the central portion of the bolt and serves to retain the bolt in position. By threading the bolt 51 within the block 52 the angular position of the links 47 can be changed to thereby vary the spacing between the lower surface of each safety bar 46 and the upper surface of the apron.

A switch mechanism is associated with each of the safety bars 46 and includes a switch 54 mounted through bracket 55 to the frame of the machine. Switch 54 has a rotatable shaft 56 that is connected to an adjustable arm 57, and the outer end of arm 57 carries a roller 58 which rests on pad 59. As shown in FIG. 9, pad 59 is secured to the end of a rod 60 that extends inwardly of the frame, and the inner end of rod 60 is attached within an opening in bar 46 by nuts 61. In the event the safety bar 46 is moved upwardly through upward deflection of the apron, the rod 60 will be raised, causing arm 57 to pivot to thereby actuate switch 54 and shut off the power of the hydraulic lift mechanism 5.

In the event of a malfunction of the controls of the lift mechanism 5, the ram 42 and pallet 4 may exert substantial upward force against the underside of the apron 1 which could cause bending or deflection of the apron. However, with the safety mechanism of the invention slight upward movement of the apron caused by pressure of the lifting mechanism will actuate the switch 54 to thereby shut off the power to the lift mechanism. This insures that there will be no damage or deformation of the tubes 15 of the apron caused by a malfunction of the controls of the lifting mechanism.

The apron assembly of the invention, by employing a series of short plastic blocks eliminates the continuous joints extending across the apron that are normally found in conventional aprons. By eliminating the continuous joints, there is a reduced tendency for cases to catch on an exposed edge, as the cases are moved onto the apron and as the apron is withdrawn from beneath the cases. In the event there may be a misalignment or slight deformation of the tubes, the blocks, being relatively short in length, will compensate for the deformation so that there will be no substantial exposed edge on which the cases can catch.

As the blocks are made of a plastic material, which has a low coefficient of sliding friction, a much quieter and smoother operation is achieved. Furthermore, the plastic blocks, being relatively light in weight, reduce the overall weight of the apron thereby decreasing the load on the drive mechanism.

The plastic blocks utilized in the apron of the invention are easier to clean than metal surfaces, and as they have self-lubricating properties it is not necessary to apply wax or other low friction coating to the apron.

Figure 6:
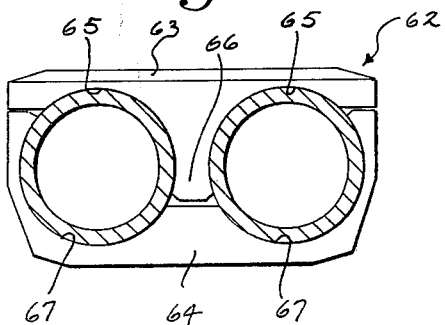
FIG. 6 is a view similar to FIG. 4 showing a modified form of the invention in which the blocks are formed in two snap-on pieces.

FIG. 6 illustrates a modified form of the invention in which the blocks 62, similar to blocks 20 of the first embodiment, are formed in two pieces and are adapted to be snapped onto the tubes 15. Each block 62 is formed of two sections 63 and 64. The section 63 is provided with a pair of curved surfaces 64 which engage the tubes 15, and a central portion 66 which extends inwardly between the adjacent tubes. Similarly, the block section 64 is provided with a pair of curved surfaces 67 which engage the surfaces of the tubes 15. With the configuration of the block sections 63 and 64, as shown in FIG. 6, both of the sections can be snap fitted onto the tubes 15 and held in place without auxilliary fasteners.

The construction, as shown in FIG. 6, enables the block sections to be readily removed from the tubes 15 without having to disconnect the tubes from the chains 18. Thus, this construction has an advantage in that the blocks can be readily removed for maintenance or repair or the size of the apron can be easily increased or decreased by adding or removing blocks.

While the above description has described the apron as being utilized in a pallet loader for cases, it is contemplated that the apron can be used in any type of loading or sorting operation for various types of containers or articles.

Various modes of carrying out the invention are contemplated as being within the scope of the following claims particularly pointing out and distinctly claiming the subject matter which is regarded as the invention.

We claim:

1. In a pallet loader, an apron assembly disposed to be moved between a generally horizontal supporting position in which the apron assembly supports a series of articles and a generally vertical non-supporting position, whereby the articles are deposited onto a pallet located beneath the horizontal position of the apron assembly, a series of generally parallel elongated elements extending transversely to the direction of movement of said apron assembly, a drive member connected to the respective ends of the elements, drive means to drive the drive member in a reciprocating path to thereby move the apron assembly between the supporting and non-supporting positions, and a series of plastic blocks each engaged with a pair of adjacent elements, each block having a length substantially less than the length of said elements whereby a series of blocks are engaged with each pair of adjacent elements, said blocks being arranged with respect to said elements so that the joints between blocks which extend in a direction longitudinally of the elements are staggered, said blocks are formed of two mating sections, each section having a pair of generally parallel recesses disposed to engage the pair of adjacent elements.

2. The pallet loader of claim 1, wherein the sections are snap-fitted on the elements.

3. In a pallet loader, an apron assembly disposed to be removed between a generally horizontal supporting position in which the apron assembly supports a series of articles and a generally vertical non-supporting position, whereby the articles are deposited onto a pallet located beneath the horizontal position of the apron assembly, a series of generally parallel elongated elements extending transversely to the direction of movement of said apron assembly, a drive member connected to the respective ends of the elements, drive means to drive the drive member in a reciprocating path to thereby move the apron assembly between the supporting and non-supporting positions, and a series of plastic blocks each engaged with a pair of adjacent elements, each block having a generally rectangular supporting surface and having a front edge and a rear edge and a pair of side edges, said front and rear edges being generally parallel to the axes of said elongated elements, said series of elongated elements including a first element, a second element and a third element, said second element being disposed between said first and third elements, a first group of said blocks being engaged with said first and second elements and a second group of said blocks being engaged with the second and third elements, a block of said second group being located between adjacent pairs of blocks of the first group and the forward and rear edges of the blocks of the first group being staggered in a direction longitudinally of the travel of the apron with respect to the corresponding front and rear edges of the blocks of the second group.

4. The pallet loader of claim 3, wherein each block has a pair of parallel holes to receive a pair of adjacent elements and each block has a generally flat supporting surface and a ganerally flat substantially continuous second surface opposite said supporting surface.

5. The pallet loader of claim 4, wherein the portions of the side edges of the blocks adjacent the supporting surfaces are beveled.

6. The pallet loader of claim 4, wherein the portions of the side edges of the blocks adjacent the second surfaces diverge outward to provide a generally V-shaped recess between adjacent blocks.

7. The pallet loader of claim 3, wherein the blocks are selected from the group consisting of polyethylene, nylon, and acetal.

8. The pallet loader of claim 3, and including support means located beneath the horizontal supporting position of the apron assembly and disposed to support a pallet, power operated drive means for moving said support means in a vertical path of movement, and sensing means for sensing upward deflection of said apron assembly when in said horizontal supporting position caused by excessive upward pressure exerted against said apron assembly by said support means, and actuating means connected to said sensing means for cutting off the power to said power operated drive means on a predetermined amount of upward deflection of said apron assembly.

9. The pallet loader of claim 8, wherein said sensing means comprising a sensing member spaced slightly above the apron assembly, and means for mounting the sensing member for upward movement.

10. The pallet loader of claim 9, wherein the sensing member comprises an elongated bar disposed generally transversely of said elements and located above the respective end portions of said elements.

11. The pallet loader of claim 10, wherein the actuating means comprises a switch connected in an electrical circuit with the power operated drive means.

* * * * *

UNITED STATES PATENT OFFICE
CERTIFICATE OF CORRECTION

PATENT NO. : 3,905,488
DATED : September 16, 1975
INVENTOR(S) : ROBERT M. LARSON and THEODORE D. GABOS It is certified that error appears in the above-identified patent and that said Letters Patent are hereby corrected as shown below:

Col. 6 Line 29 After "power" cancel "of" and substitute therefor ---to---
Col. 7 Line 55 Cancel "removed" and substitute therefor ---moved---

Signed and Sealed this twentieth Day of January 1976

[SEAL]

Attest:

RUTH C. MASON
Attesting Officer

C. MARSHALL DANN
Commissioner of Patents and Trademarks